(12) United States Patent
Puranik

(10) Patent No.: US 8,352,648 B1
(45) Date of Patent: Jan. 8, 2013

(54) CREDIT-BASED FLOW CONTROL

(75) Inventor: Kiran S. Puranik, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 47 days.

(21) Appl. No.: 12/952,139

(22) Filed: Nov. 22, 2010

(51) Int. Cl.
*G06F 3/00* (2006.01)
*G06F 5/00* (2006.01)

(52) U.S. Cl. .......................................... 710/36; 710/53
(58) Field of Classification Search .................. 710/36, 710/53
See application file for complete search history.

(56) References Cited

U.S. PATENT DOCUMENTS

| | | | |
|---|---|---|---|
| 7,535,254 B1 | 5/2009 | Case | |
| 7,557,607 B1 | 7/2009 | Tran et al. | |
| 7,573,295 B1 | 8/2009 | Stadler | |
| 7,626,418 B1 | 12/2009 | Kolze et al. | |
| 7,702,840 B1 | 4/2010 | McCarthy et al. | |
| 2003/0193892 A1* | 10/2003 | Sharma | 370/229 |
| 2009/0010159 A1* | 1/2009 | Brownell et al. | 370/231 |
| 2010/0017547 A1* | 1/2010 | Das et al. | 710/35 |
| 2011/0116511 A1* | 5/2011 | Schmidt et al. | 370/412 |

FOREIGN PATENT DOCUMENTS

WO   WO 2009012426 A2 *  1/2009

* cited by examiner

*Primary Examiner* — Chun-Kuan Lee
*Assistant Examiner* — Farley Abad
(74) *Attorney, Agent, or Firm* — W. Eric Webostad; Gerald Chan

(57) ABSTRACT

An embodiment of a method for credit-based flow control is disclosed. For this embodiment of the method, a first transaction layer packet from a sending device is loaded into a receiver buffer of a receiving device. A second transaction layer packet is loaded into the receiver buffer, where the second transaction layer packet is of a different packet type than the first transaction layer packet. The first transaction layer packet is unloaded from the receiver buffer without return of a credit for the unloading of the first transaction layer packet from the receiver buffer. The first transaction layer packet is loaded into a side buffer, and the credit for the first transaction layer packet is sent to the sending device responsive to unloading or anticipated unloading of the first transaction layer packet from the side buffer.

18 Claims, 7 Drawing Sheets

CREDIT-BASED FLOW CONTROL

FIELD OF THE INVENTION

An embodiment of the invention relates to integrated circuit devices ("ICs"). More particularly, an embodiment of the invention relates to credit-based flow control for an IC.

BACKGROUND

Peripheral Component Interconnect Express ("PCIe") uses conventional credit-based flow control. In such a conventional credit-based flow control environment, one or more posted packets may block other packets, such as one or more completion packets for example. Hence it would be desirable and useful to avoid or reduce such blocking.

SUMMARY

One or more embodiments generally relate to credit-based flow control.

An embodiment relates generally to a method for credit-based flow control. In such an embodiment, a first transaction layer packet from a sending device is loaded into a receiver buffer of a receiving device. A second transaction layer packet is loaded into the receiver buffer, where the second transaction layer packet is of a different packet type than the first transaction layer packet. The first transaction layer packet is unloaded from the receiver buffer without return of a credit for the unloading of the first transaction layer packet from the receiver buffer. The first transaction layer packet is loaded into a side buffer, and the credit for the first transaction layer packet is sent to the sending device responsive to unloading or anticipated unloading of the first transaction layer packet from the side buffer.

Another embodiment relates generally to a receiver device. Such an embodiment includes a switch block to receive a credit and to receive a return control signal, where the return control signal puts the switch block in an open state or a closed state. This embodiment further includes a flow control update block, coupled to the switch block, to receive the credit passed from the switch block when the switch block is in the open state, where when the switch block is in the open state, the switch block has access to the flow control update block, and when the switch block is in the closed state, the switch block is denied access to the flow control update block. The flow control update block stores a flow control value and updates the flow control value with the credit.

An embodiment relates generally to a method for credit updating for flow control. In such an embodiment, transaction layer packets, including posted packets and completion packets, are received from a sender. The transaction layer packets are loaded into a first-in first-out buffer of a receiver, where a posted packet blocks a completion packet in the first-in first-out buffer. A credit associated with the posted packet is obtained for processing the posted packet out of the first-in first out buffer. A return flow control signal is transitioned to prevent a flow control value from being updated with the credit associated with the posted packet. The posted packet is loaded into a first set aside buffer. The flow control value is sent as a flow control update to the sender without the credit, and the completion packet is unloaded from the first-in first-out buffer.

BRIEF DESCRIPTION OF THE DRAWINGS

Accompanying drawings show exemplary embodiments in accordance with one or more aspects of the invention; however, the accompanying drawings should not be taken to limit the invention to the embodiments shown, but are for explanation and understanding only.

DETAILED DESCRIPTION

Figure 1:
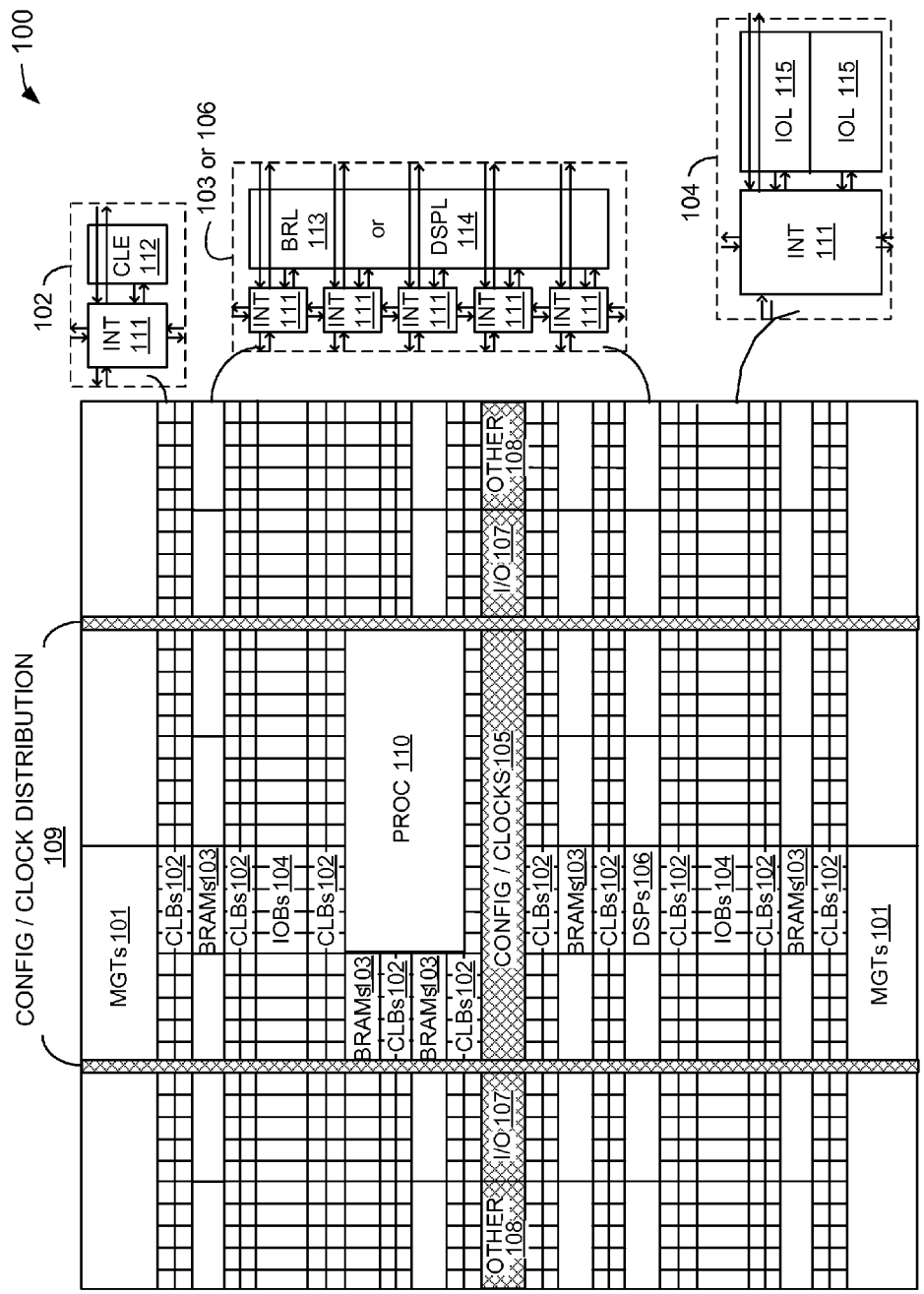
FIG. 1 is a simplified block diagram depicting an exemplary embodiment of a columnar Field Programmable Gate Array ("FPGA") architecture in which one or more aspects of the invention may be implemented.

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As indicated above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In some integrated circuits, including FPGA 100 of FIG. 1, there may be dedicated circuits for providing an interface to peripherals and other devices. Such interfaces may include a receiver for receiving information from a sender, and such receiver may pass the information along. In a PCIe system, credit flows from a consumer, such as a sender, to a source, such as a receiver. Unless a consumer has available credits to consume or "spend," then such consumer cannot send packets to a source. In a PCIe system, a receiver of a transaction layer advertises a maximum amount, K, of credits for each of its receive buffers. A sender, which is coupled via a link or lane to the receiver, counts the number of credits consumed for each transaction layer packet ("TLP") sent to a receiver, namely decrements available credits for a receiver buffer. For a PCIe protocol, such a sender generally is not allowed to send or transmit a TLP to a receiver that would result in exceeding a credit limit for a receiver's buffer. In short, a credits used count may thus not exceed a credit limit of receiver buffering.

Figure 2:
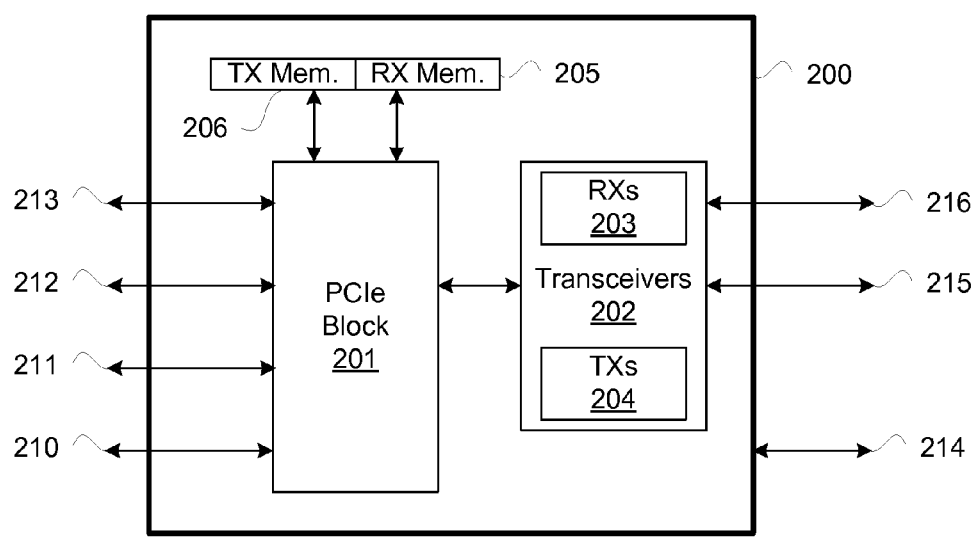
FIG. 2 is a block diagram depicting an exemplary embodiment of an integrated block.

FIG. 2 is a block diagram depicting an exemplary embodiment of an integrated block 200. Integrated block 200 is for PCIe communication. Integrated block 200 may be a hard block, namely dedicated integrated circuitry, in an integrated circuit, such as FPGA 100 of FIG. 1 for example.

Integrated block 200 includes transceivers 202, transmit ("TX") memory 206, receive ("RX") memory 205, and PCIe block 201. Transceivers 202 include receivers 203 and transmitters 204. For PCIe, a receiver and a transmitter pair are used for each lane. Bus 216 generally depicts a bus between transceivers 202 and PCIe "fabric" or interconnect. Bus 215 may be coupled to user logic for an optional debug circuit. System signals, such as clock and reset, may be coupled to integrated block 200 via bus 214.

Bus 210 may be coupled to other optional user debug circuitry and PCIe block 201. Bus 211 may be coupled to a host interface and PCIe block 201 for providing configuration information to PCIe block 201. Bus 212 may be a physical layer bus coupling physical layer control and status information to PCIe block 201. Bus 213 may be a transaction layer bus for coupling a user application, such as may be instantiated in programmable resources in whole or in part for example, to PCIe block 201. Thus, bus 213 may be thought of as a programmable resource interconnect.

Figure 3:
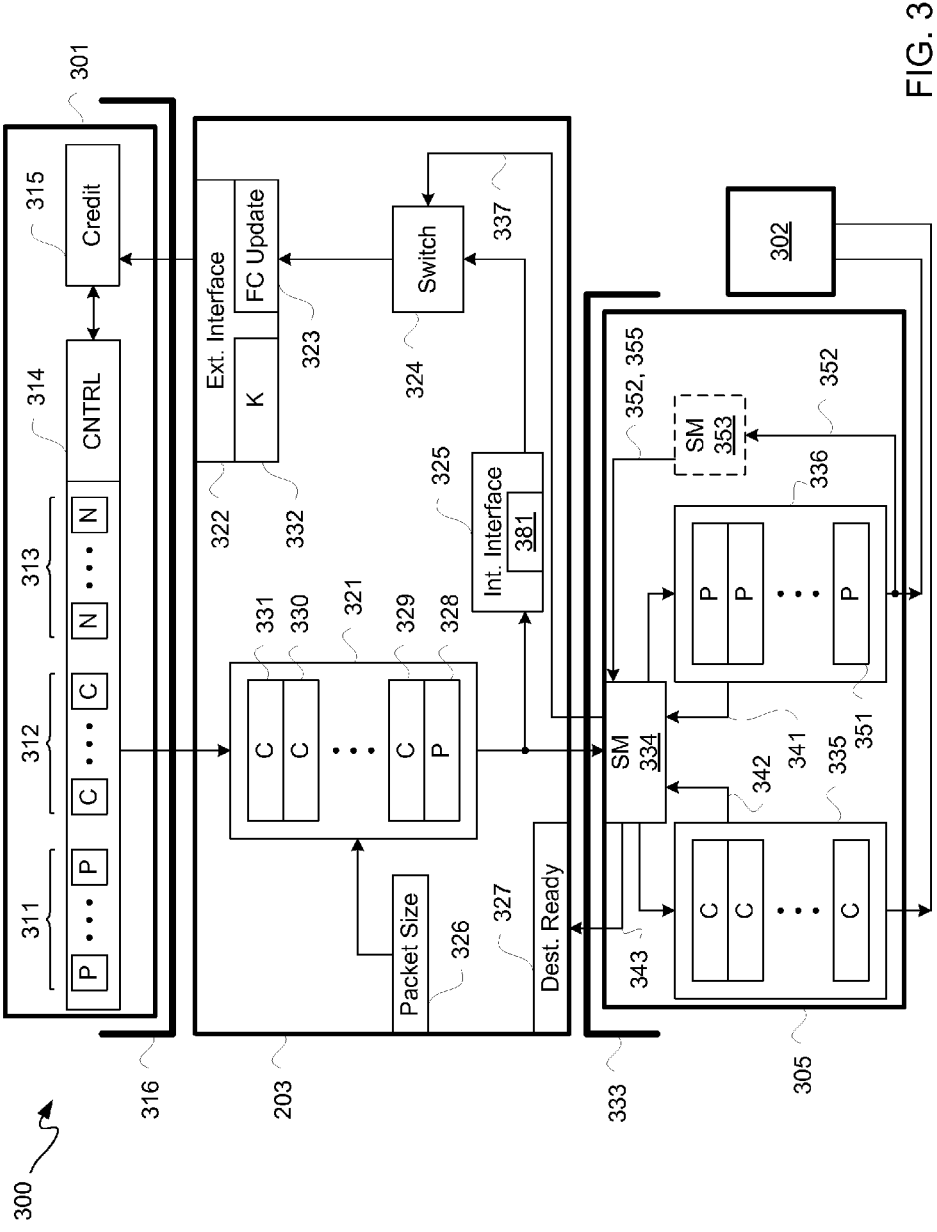
FIG. 3 is a block diagram depicting an exemplary embodiment of a PCIe communication system.

FIG. 3 is a block diagram depicting an exemplary embodiment of a PCIe communication system 300. PCIe communication system 300 includes sender device ("sender") 301, receiver device ("receiver") 203, receiver extension 305, and user application 302. It should be understood that receiver 203 may be for a PCIe lane. In this exemplary embodiment, receiver extension 305 is instantiated using programmable resources, such as of FPGA 100 of FIG. 1 for example, and receiver 203 is a hard block, as previously described with reference to FIG. 2. However, it should be understood that in other embodiments receiver 203 and receiver extension 305 may both be hard blocks or may both be instantiated in programmable resources. However, for purposes of clarity by way of example and not limitation, it shall be assumed that receiver 203 is interconnected with receiver extension 305 such as via programmable fabric interconnect 333, namely bus 213 of FIG. 2.

Sender 301 may include different types of packets. For example, sender 301 may include posted packets ("P") 311, completion packets ("C") 312, and/or non-posted packets ("N") 313. A controller 314 of sender 301 may be set for operating in a relaxed ordering mode. By relaxed ordering mode, it should be understood that packets, including different types of packets, may be sent out of order with respect to other packets. More particularly for the example described herein, completion packets 312 may be sent instead of posted packets 311. Sender 301 includes a credit block, such as credit block 315, for flow control as described below in additional detail.

More generally, heretofore after a posted packet was unloaded from a receiver buffer, such posted packet was generally immediately processed, and a return of credit or credits ("credit") was correspondingly immediately signaled to the sender. Such sender in response may have thus increased a current available amount of credit for posted packets by such restored or returned amount to send one or more other posted packets. However, as described below in additional detail, by postponing processing of a posted packet, or more particularly a blocking posted packet, completion packets may be processed one after another. In other words, by not sending new or updated credit values for a limited period of time, blocking posted packets may be cleared allowing for processing of completion packets at a line rate.

Receiver 203 may be coupled to sender 301 via interconnect 316. Interconnect 316 was previously described as bus 216 of FIG. 2. Receiver 203 includes buffer 321, posted credit external interface block 322, switch block 324, posted credit internal interface block 325, packet size block 326, and destination ready block 327.

Buffer 321 is coupled to receive packets from sender 301. In an embodiment, buffer 321 is a first-in first-out buffer ("FIFO"). Buffer 321 may have a width defined responsive to a setting of packets size block 326. Examples of byte width settings include 128 bytes, 256 bytes, 512 bytes, or 1024 bytes; however other byte settings may be used. It should be understood that available sizes for defining byte width of entries for buffer 321 may not span the entire range of possible packet widths. For example, if a maximum packet width of packets size block 326 is 1024 bytes, and if a maximum packet width or length is 4096 bytes, then if a maximum packet width size setting is used, a packet of maximum length may use four entries in buffer 321. For PCIe, packets may range from a minimum of 4 bytes to a maximum of 4096 bytes in length. Of course, these or other buffer and/or packet lengths or widths may be used.

It should be understood that the example buffering of C and P packets in buffer 321 should not be construed as limiting of any embodiment. It should be understood that any combination of C, N, and/or P packets may be used. However, for purposes of clarity by way of example and not limitation, it should be understood that a posted packet, such as posted packet 328, in front of one or more completion packets, such as completion packets 329 through 331, may be blocking processing of such completion packets. In other words, if there were no ability to set aside posted packet 328, then posted packet 328 would have to be processed prior to processing of completion packets 329. However, in some applications it may be useful to hold off processing a posted packet, such as posted packet 328 for example, in favor of processing one or more completion packets, such as completion packets 329, 330, and 331 for example, at a line rate for a user application 302.

Again, heretofore posted packet 328 was generally immediately processed after exiting buffer 321 causing corresponding immediate issuance of a credit associated with such posted packet 328, and such credit returned to sender 301 updated an available credit count in credit block 315 of sender 301. However, as described below herein in additional detail, posted packet 328 is not immediately processed upon exiting buffer 321, and a credit for posted packet 328 is not immediately returned to sender 301 after posted packet 328 is unloaded from buffer 321.

After exiting from buffer 321, posted packet 328 is interrogated by state machine ("SM") 334, and a credit for posted packet 328 is stored, such as registered in register 381 of posted credit internal interface block 325. State machine 334, set aside or side buffer 335, and set aside or side buffer 336 are part of receiver extension 305. If, after interrogation, state machine 334 determines that a received packet, such as posted packet 328 for example, is a posted type, then state machine 334 passes such posted packet to buffer 336. In this exemplary embodiment, buffer 336 is a FIFO used exclusively for storing one or more posted packets.

If a packet received by state machine 334 is determined to be other than a posted type of packet, then after interrogation by state machine 334, such other type of packet may be passed from state machine 334 to buffer 335. In this exemplary embodiment, buffer 335 is a FIFO used for all packets other than posted packets.

Thus, a posted packet is not immediately processed after exiting buffer 321; rather, a posted packet is immediately processed after exiting buffer 336. Thus, a credit for processing a posted packet is postponed until such posted packet is unloaded from or about to be unloaded from buffer 336. In other words, buffer 336 is a set aside or side buffer with respect to buffer 321 for posted packets.

Posted packets in buffer 321 may be cleared and temporarily stored in buffer 336. By clearing a posted packet from buffer 321, such posted packet may not block subsequent packets. More particularly, this allows completion packets, such as completion packets 329 through 331 for example, to proceed without having to immediately process a leading posted packet first. For example, if user application 302 was an interface to memory and if posted packet 328 was for write to such memory, it may take some time for completing processing such a posted packet 328 thus delaying processing of completion packet 329. However, delaying processing of completion packet 329 is avoided, because posted packet 328 may be moved out of buffer 321 to buffer 336. In other words, by having a set aside buffer, such as buffer 336 for example, completion packets 329 may be unloaded from buffer 321 without having to wait for processing a write to memory in this example. It should be understood that a write to memory, as well as a user application 302 for memory, was described for purposes of clarity by way of example and not limitation, and that other types of applications associated with PCIe, or other credit-based flow control communication protocol, may be used.

State machine 334 provides a return control signal 337 to switch block 324. Return control signal 337 is for opening and closing access from switch block 324 to flow control update block 323. In this exemplary embodiment, posted credit external interface block 322 includes a register for storing K, namely K block 332, and a register for storing a flow control update value, namely "FC Update" block 323.

Until state machine 334 asserts return control signal 337, switch block 324 may be in a closed state to prevent posted credit internal interface block 325 from passing any posted packet credit to flow control update block 323. Flow control update block 323 may hold a flow control update value, x, which it provides to posted credit external interface block 322 for sending to credit block 315.

Posted credit external interface block 322 may be configured with a setting K in K block 332. Such setting K may indicate a size or depth of buffer 321, and such setting K may be advertised or otherwise provided from posted credit external interface block 322 to credit block 315 of sender 301. Accordingly, sender 301 may set a total available amount of credit for packets to be sent to buffer 321 of receiver 203 in response to setting K.

Buffer 336 may provide a control signal 341 to state machine 334. Such a control signal 341 may be used to indicate that buffer 336 has reached a threshold value for storing posted packets. In other words, control signal 341 may be used to avoid overflowing buffer 336. Likewise, buffer 335 may provide a control signal 342 to state machine 334. Such a control signal 342 may be used indicate that buffer 335 has reached a threshold value for storing packets. In other words, control signal 342 may be used to avoid overflowing buffer 335.

State machine 334 may be coupled to provide control signal 343 to destination ready block 327. State machine 334 may be configured to maintain or park control signal 343 in an asserted state, and de-assert control signal 343 responsive to either of control signals 341 or 342 being asserted. Thus for example, if either of buffers 335 or 336 has reached a threshold level, state machine 334 may de-assert control signal 343 in response to either of control signals 341 or 342 being asserted to cause destination ready block 327 to inform sender 301 that receiver 203 is not presently ready to receive any further packets. Control signaling from destination ready block 327 to sender 301 is not illustratively depicted for purposes of clarity and not limitation. Furthermore, when neither of control signals 341 and 342 is asserted, control signal 343 is maintained asserted, and accordingly destination ready block 327 informs sender 301 that receiver 203 is presently ready to receive further packets.

As each posted packet leaves buffer 336, state machine 334 may receive an indication via a control signal 352. Even though multiple packets may be processed at a time, as described below in additional detail, for purposes of clarity by way of example and not limitation with reference to FIG. 3, it shall be assumed that a single posted packet 351 is processed.

An indication of posted packet 351 leaving buffer 336 is provided to state machine 334 via control signal 352. Responsive to de-assertion or assertion of control signal 352 respectively depending on whether negative or positive logic is used, state machine 334 may transition return control signal 337 to allow a posted credit in posted credit internal interface block 325 to pass to flow control update block 323 via switch block 324. Thus, an update value in flow control update block 323 may be updated with a credit value in posted credit internal interface block 325. Such updated update value may be passed from flow control update block 323 to posted credit external interface block 322 for credit block 315 of sender 301.

Optionally, a state machine 353 may be coupled to receive control signal 352 from buffer 336. State machine 353 may be configured to transition control signal 355 in anticipation of posted packet 351 being unloaded from buffer 336. This anticipatory assertion, or de-assertion, of control signal 355 is to account for associated delays, as may vary from application-to-application, in processing. Generally such delays may be associated with processing credits and issuing packets.

Control signal 352 or 355 provided to state machine 334 may be a receive flow control posted return control signal. For purposes of clarity by way of example and not limitation, it shall be assumed that state machine 353 is used.

Control signal 355 may be provided from state machine 353 to state machine 334. In response to assertion or de-assertion of control signal 355, state machine 334 may transition control signal 337, as previously described, to selectively control opening of switch block 324.

State machine 353 may be instantiated in programmable resources as part of a provided soft core with default values. However, in other embodiments, state machine 353 may be part of user application 302, and thus such a user application may control assertion or de-assertion of control signal 355.

State machine 334 may de-assert or assert control signal 337 to close switch block 324. It should be understood that switch block 324 may include a switch, a gating transistor, or other circuitry for purposes of preventing or allowing posted credits to pass as described herein.

Figure 4:
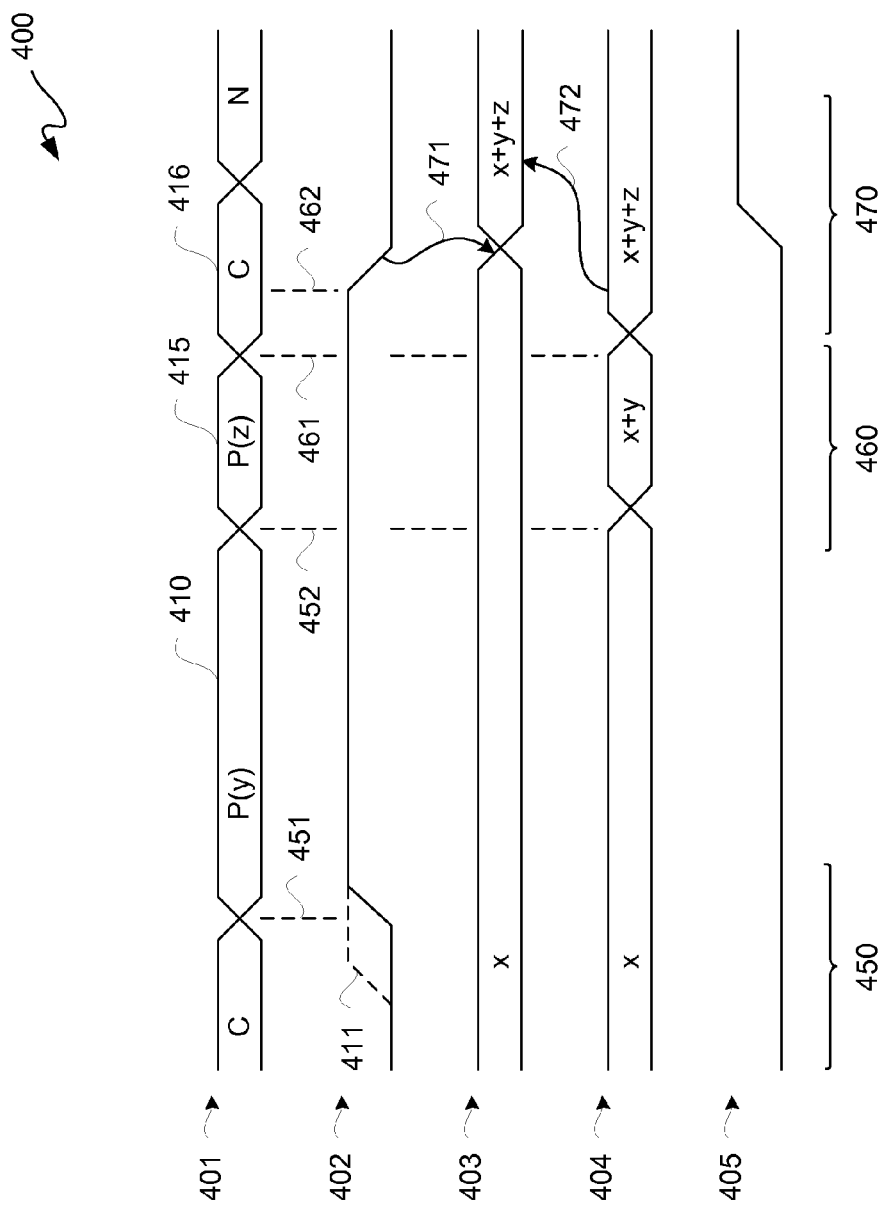
FIG. 4 is a signal diagram depicting an exemplary embodiment of a credit updating operation.

FIG. 4 is a signal diagram depicting an exemplary embodiment of a credit updating operation 400. Credit updating operation 400 is described with simultaneous reference to FIGS. 3 and 4. For purposes of clarity by way of example and not limitation, control signals in FIG. 4 are described as using negative logic.

Packets are unloaded from buffer 321 as indicated by data stream signal 401. A posted credit return value, x, is stored in both posted credit internal interface block 325 and flow control update block 323 generally during an initial time interval 450, as respectively indicated by data signals 404 and 403. During time interval 450, a transaction receive destination ready control signal 405, such as associated with destination ready block 327, is maintained in a logic low state to indicate that receiver 203 is in ready condition.

Generally at time 451, a posted packet 410 having a credit value, y, associated with its packet length is initially output from buffer 321. Responsive to output of posted packet 410 from buffer 321, a transaction receive flow control posted return signal 402, which may be control signal 355, is transition from a logic low state to a logic high state. It should be understood that even though transaction receive flow control posted return signal 402 is transition generally at time 451, such transaction receive flow control posted return signal 402 may be transitioned before, at, or after time 451 as generally indicated by dashed line 411. Furthermore, it should be understood that transitioning of other signals as described with reference to FIG. 4 may vary somewhat in the timing of such transitions as should be understood from the following description.

In this exemplary embodiment, transaction receive flow control posted return signal 402 is a negative logic signal, and thus such transaction receive flow control posted return signal 402 is generally de-asserted at time 451. Likewise, in this exemplary embodiment, transaction receive destination ready signal 405 is a negative logic signal, and thus it is asserted when in a logic low state. Accordingly, de-assertion of a negative logic signal is a logic high state. However, it should be understood that positive logic signaling may likewise be used as previously described.

At time 452, posted packet 410 has completed being output from buffer 321 and an immediately subsequent packet in a stack of buffer 321 is output as posted packet 415. Posted packet 415 has a credit value, z, associated with it. It should be understood that in PCIe, packets of varying lengths may be used. Accordingly, a longer posted packet may have a larger credit value than a shorter posted packet.

Responsive to completion of output of posted packet 410, data signal 404 is updated with credit value, y, associated with posted packet 410 generally in time interval 460. In other words, a value x stored in posted credit internal interface block 325 is updated with a value y, namely x+y. However, during time interval 460, a flow control update value is not updated. In other words, a value x stored in flow control update block 323 is not updated. Thus, flow control update value, x, sent to sender 301 during time interval 460 is stale.

At time 461, posted packet 415 has completed output from buffer 321. Responsive to completion of output of posted packet 415, data signal 404 is updated with credit value, z, associated with posted packet 415 generally in time interval 470. In other words the current contents of posted credit internal interface block 325, which in this example is x+y, is updated with a credit value z such that a current value stored is x+y+z.

A packet immediately following posted packet 415 as indicated in data stream signal 401 is a completion packet 416. Responsive to an end of a sequence of outputs of posted packets, transaction receive flow control posted return signal 402 may be transitioned from a logic high state to a logic low state generally at time 462. Responsive to transition of transaction receive flow control posted return signal 402, generally during time interval 470, switch block 324 is opened, as generally indicated by line 471, to allow contents of data signal 404 to be transferred to data signal 403, as generally indicated by line 472.

Figure 5:
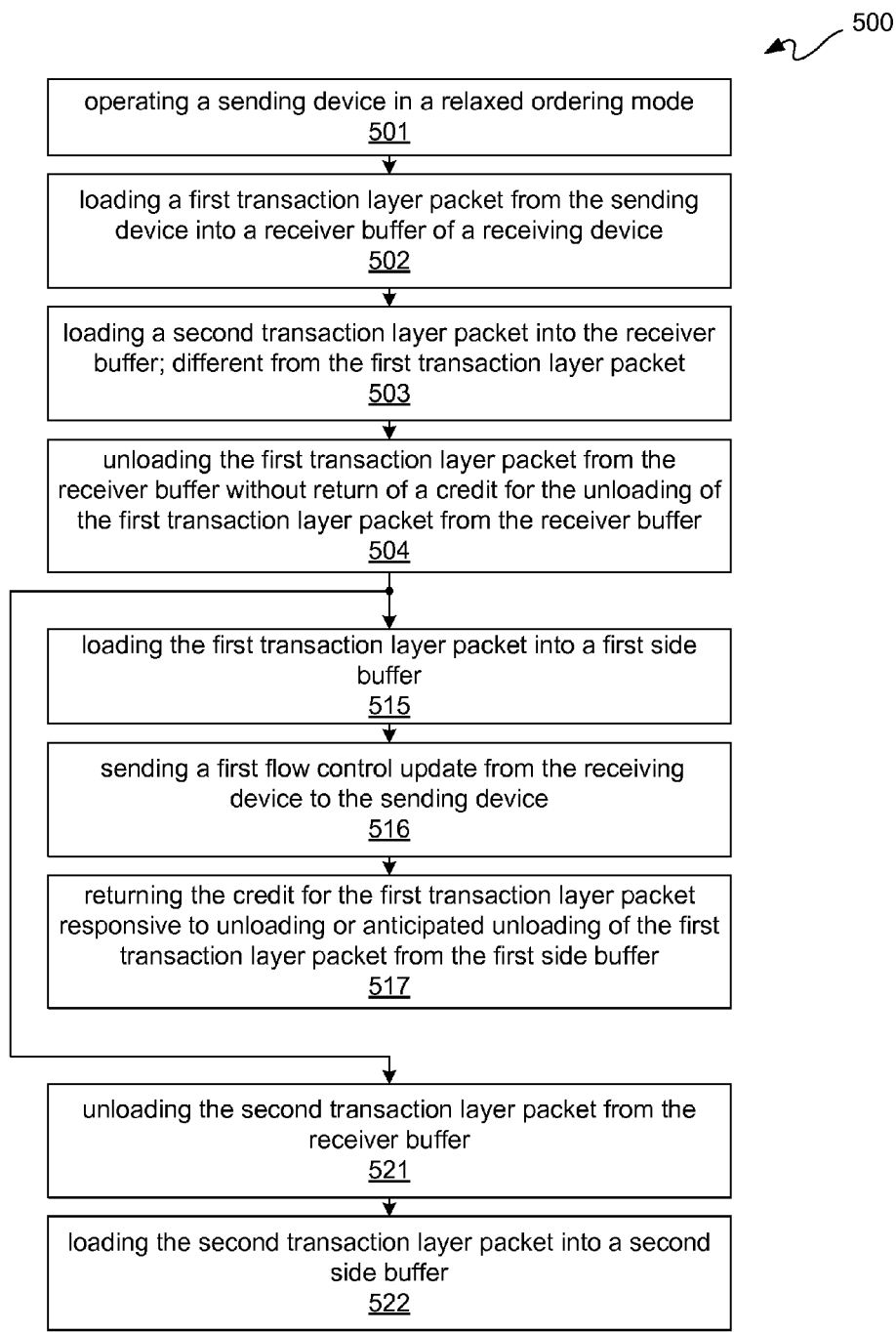
FIG. 5 is a flow diagram picking an exemplary embodiment of a credit update process for flow control.

FIG. 5 is a flow diagram picking an exemplary embodiment of a credit update process 500 for flow control. Credit update process 500 is further described with simultaneous reference to FIGS. 3 and 5.

At 501, a sending device, such as sender 301, is operated in a relaxed ordering mode. At 502, a first transaction layer packet is loaded from sending device to a receiver buffer, such as buffer 321, of a receiving device, such as receiver 203. Such a first transaction layer packet may be a posted packet, such as posted packet 328.

At 503, a second transaction layer packet is loaded to the receiver buffer. In this exemplary embodiment, the second transaction layer packet is different from the first transaction layer packet. For example, the second transaction layer packet may be a completion packet, such as completion packet 329. However, it should be appreciated that one or more other posted packets may precede such second transaction layer packet, as previously described with reference to FIG. 4.

At 504, the first transaction layer packet is unloaded from the receiver buffer without return of a credit for the unloading of the first transaction layer packet from the receiver buffer. For example, a credit associated with a posted packet 328 unloaded from buffer 321 is not returned responsive to the unloading thereof.

At 515, the first transaction layer packet is loaded into a first side buffer. For example, posted packet 328 may be loaded into buffer 336. At 516, a first flow control update from the receiving device is sent to the sending device. For example, flow control update block 323 sends a stale flow control update credit to sender 301. At 517, the credit for the first transaction layer packet is returned to the sending device responsive to unloading or anticipated unloading of the first transaction layer packet from the first side buffer. For example, a credit associated with posted packet 328 may be returned to sender 301 responsive to unloading or anticipating unloading of such packet from buffer 336.

In parallel with operations 515 through 517, at 521, the second transaction layer packet may be unloaded from the receiver buffer after the first transaction layer packet is unloaded at 504. For example, completion packet 329 may be unloaded from buffer 321. At 522, the second transaction layer packet unloaded at 521 may be loaded into a second side buffer. For example, completion packet 329 unloaded at 521 may be loaded into buffer 335 at 522.

Figure 6:
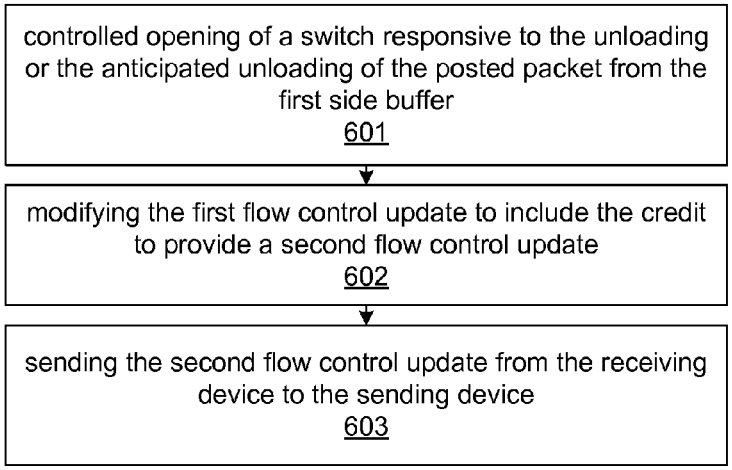
FIG. 6 is a flow diagram depicting an exemplary embodiment of operations for an operation the credit update process of FIG. 5.

FIG. 6 is a flow diagram depicting an exemplary embodiment of operations for operation 505 of FIG. 5. At 601, a switch may be controllably opened responsive to the unloading or the anticipated unloading of a posted packet from the first side buffer. For example, switch block 324 may be put in an open state or condition for passing credit.

At 602, the first flow control update is modified to include the credit to provide a second flow control update. For example, a credit associated with posted packet 351 may be passed through switch block 324 for appending or adding to a current value of a flow control update credit.

At 603, the second flow control update is sent from the receiving device to the sending device. For example, a flow control value with a credit for posted packet 351 may be sent from receiver 203 to sender 301.

Figure 7:
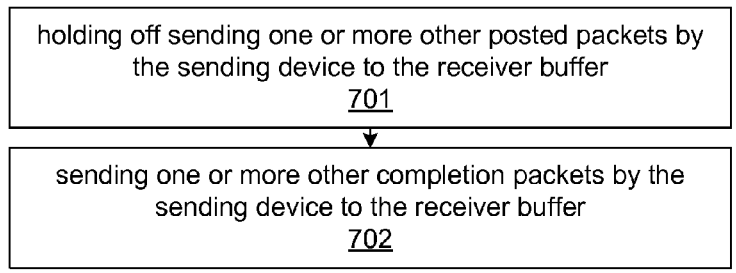
FIG. 7 is a flow diagram depicting an exemplary embodiment of a relaxed ordering mode of operation.

FIG. 7 is a flow diagram depicting an exemplary embodiment of a relaxed ordering mode of operation 700. At 701, the sending device holds off sending one or more other posted packets to the receiver buffer. For example, by having a relaxed ordering mode at 501 of FIG. 5, packets may be sent in any order and such packets may be of any type.

Furthermore, certain types of packets may effectively be temporarily prevented or delayed from being sent as follows. Effectively, by postponing the return of posted credits to credit block 315 of sender 301, sender 301 may be starved for available posted credits. Thus, sender 301 may send other packets, namely packets other than posted packets, such as for example completion packets or non-posted packets. At 702, one or more other completion packets may be sent by the sending device to the receiver buffer. For example, sender 301 may send completion packets 312 to buffer 321 without any intervening posted packets 311 being sent for a period of time of starvation of available posted credit. This may facilitate piping or pipelined operation of unloading and processing completion packets, such as for processing at a line rate for example.

Figure 8:
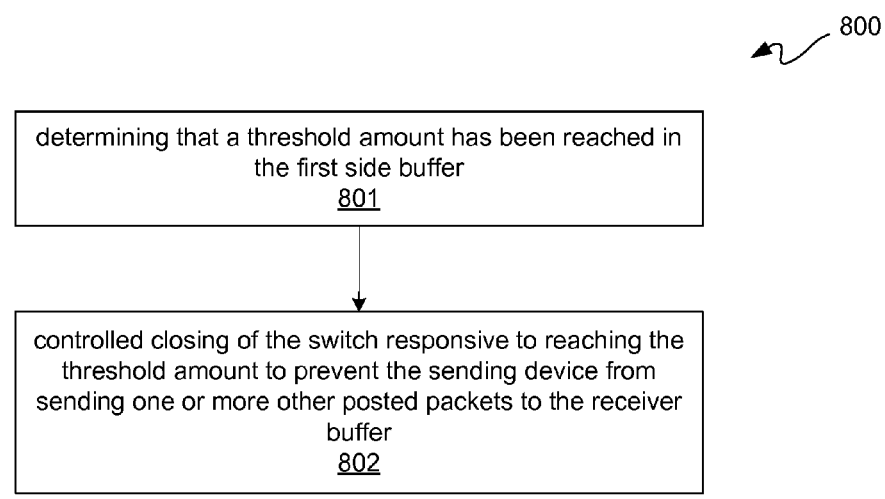
FIG. 8 is a flow diagram depicting an exemplary embodiment of an overflow control process.

FIG. 8 is a flow diagram depicting an exemplary embodiment of an overflow control process 800. At 801, it is determined that a threshold amount has been reached in the first side buffer. For example, control signal 342 is asserted from buffer 336 to generally indicate that buffer 336 is at capacity, namely full or near full. At 802, the switch is controllably closed responsive to reaching the threshold amount to prevent the sending device from sending one or more other posted packets to the receiver buffer. For example, switch block 324 is closed to prevent any further credits from reaching sender 301, and thus as previously described with reference to FIG. 7, sender 301 may effectively be prevented from sending one or more other posted packets to buffer 321.

While the foregoing describes exemplary embodiments in accordance with one or more aspects of the invention, other and further embodiments in accordance with the one or more aspects of the invention may be devised without departing from the scope thereof, which is determined by the claims that follow and equivalents thereof. For example, even though embodiments were described with reference to PCIe, it should be understood that other communication protocols with credit-base flow control may be used. Furthermore, even though blocking packets were described as posted packets, and even though completion packets were described as the type of packets being blocked by one or more posted packets, it should be understood that any type of transaction layer packet may be considered to be blocking any other one or more transaction layer packets of a different packet type.

Claims listing steps do not imply any order of the steps. Trademarks are the property of their respective owners.

What is claimed is:

1. A method for credit-based flow control, comprising:
    loading a first transaction layer packet from a sending device into a receiver buffer of a receiving device;
    loading a second transaction layer packet into the receiver buffer, wherein the second transaction layer packet is of a different packet type than the first transaction layer packet, wherein the receiver buffer is configured to simultaneously buffer a plurality of transaction layer packets that includes one or both of the first transaction layer packet and the second transaction layer packet;
    unloading the first transaction layer packet from the receiver buffer without return of a credit for the unloading of the first transaction layer packet from the receiver buffer;
    loading the first transaction layer packet into a first side buffer;
    sending the credit for the first transaction layer packet to the sending device responsive to unloading or anticipated unloading of the first transaction layer packet from the first side buffer;
    unloading the second transaction layer packet from the receiver buffer;
    loading the second transaction layer packet into a second side buffer, wherein the first transaction layer packet is a posted packet, and wherein the second transaction layer packet is a completion packet; and
    sending a first flow control update from the receiving device to the sending device after the unloading of the posted packet from the receiver buffer and prior to the sending of the credit for the first transaction layer packet.

2. The method according to claim 1, further comprising operating the sending device in a relaxed ordering mode.

3. The method according to claim 1, wherein the receiving device is of a Peripheral Component Interconnect Express ("PCIe") system.

4. The method according to claim 1, further comprising:
    controlled opening of a switch responsive to the unloading or the anticipated unloading of the posted packet from the first side buffer;
    modifying the first flow control update to include the credit to provide a second flow control update; and
    sending the second flow control update from the receiving device to the sending device.

5. The method according to claim 4, further comprising:
    holding off sending one or more other posted packets by the sending device to the receiver buffer; and
    sending one or more other completion packets by the sending device to the receiver buffer.

6. The method according to claim 4, further comprising:
    determining that a threshold amount has been reached in the first side buffer; and
    controlled closing of the switch responsive to reaching the threshold amount to prevent the sending device from sending one or more other posted packets to the receiver buffer.

7. A receiver device, comprising:
    a switch block to receive a credit and to receive a return control signal, wherein the return control signal puts the switch block in an open state or a closed state; and
    a flow control update block, coupled to the switch block, to receive the credit passed from the switch block when the switch block is in the open state, wherein when the switch block is in the open state, the switch block has access to the flow control update block, and when the switch block is in the closed state, the switch block is denied access to the flow control update block,
    wherein the flow control update block stores a flow control value and updates the flow control value with the credit.

8. The receiver device according to claim 7, further comprising:
    a storage buffer coupled to receive transaction layer packets;
    a credit block coupled to the storage buffer to generate the credit for a transaction layer packet unloaded from the storage buffer;
    the switch block coupled to the credit block to receive the credit; and
    a return interface coupled to the flow control update block to receive the flow control value.

9. The receiver device according to claim 8, further comprising:
    a controller coupled to receive the transaction layer packet from the storage buffer; and
    a first side buffer and a second side buffer each coupled to the controller to selectively receive the transaction layer packet.

10. The receiver device according to claim 9, wherein:
    the controller is a state machine;
    the state machine is configured to pass each posted packet received as the transaction layer packet to the first side buffer; and
    the state machine is further configured to pass each non-posted packet and each completion packet received as the transaction layer packet to the second side buffer.

11. The receiver device according to claim 10, wherein:
    the state machine is coupled to receive a first threshold signal from the first side buffer and a second threshold signal from the second side buffer; and
    the state machine is further coupled to receive a flow control signal.

12. The receiver device according to claim 11, wherein the state machine is configured to assert a destination ready signal provided that neither the first threshold signal nor the second threshold signal are asserted.

13. The receiver device according to claim 11, wherein the state machine is configured to assert the return control signal for the allowing of access from the switch block to the flow control update block responsive to assertion of the flow control signal.

14. A system including the receiver device of claim 8, the system further including:
    a sender device coupled to the receiver device to provide the transaction layer packets to the storage buffer;
    the sender device further coupled to the return interface to receive the flow control value; and a core instantiated using programmable resources coupled to the receiver device;

the core including:
- a controller coupled to receive the transaction layer packet from the storage buffer; and
- a first side buffer and a second side buffer each coupled to the controller to selectively receive the transaction layer packet.

15. The system according to claim 14, wherein:

the controller is configured to pass each posted packet received as the transaction layer packet to the first side buffer; and the controller is further configured to pass each non-posted packet and each completion packet received as the transaction layer packet to the second side buffer.

16. The system according to claim 15, further comprising:

a state machine coupled to an output port of the first side buffer and to the controller;

wherein the state machine is configured to assert a flow control signal responsive to the transaction layer packet being output from the first side buffer; and wherein the controller is coupled to receive the flow control signal and configured to assert the return control signal for the allowing of access from the switch block to the flow control update block responsive to assertion of the flow control signal.

17. A method for credit updating for flow control, comprising:

receiving transaction layer packets, including posted packets and completion packets, from a sender;

loading the transaction layer packets into a first-in first-out buffer of a receiver, wherein a posted packet blocks a completion packet in the first-in first-out buffer;

obtaining a credit associated with the posted packet for processing the posted packet out of the first-in first-out buffer;

transitioning a return flow control signal to prevent a flow control value from being updated with the credit associated with the posted packet;

loading the posted packet into a first set aside buffer;

sending the flow control value as a flow control update to the sender without the credit; and unloading the completion packet from the first-in first-out buffer.

18. The method according to claim 17, further comprising:

loading the completion packet into a second set aside buffer;

processing the completion packet out of the second set aside buffer in advance of processing of the posted packet out of the first set aside buffer;

transitioning the return flow control signal to allow the flow control value to be updated with the credit responsive to the processing of the posted packet out of the first set aside buffer;

updating the flow control value with the credit; and sending the flow control value updated with the credit to the sender as the flow control update.

* * * * *